W. F. HALL, DEC'D.
W. F. HALL, EXECUTRIX.
TROLLEY CAR.
APPLICATION FILED OCT. 15, 1915.

1,219,098.

Patented Mar. 13, 1917.

INVENTOR:
William F. Hall
by Meashord, Cator, Copeland & Dike
Attys.

UNITED STATES PATENT OFFICE.

WILLIAM F. HALL, OF NEWTON, MASSACHUSETTS; WINIFRED F. HALL EXECUTRIX OF SAID WILLIAM F. HALL, DECEASED.

TROLLEY-EAR.

1,219,098.　　　　　　Specification of Letters Patent.　　Patented Mar. 13, 1917.

Application filed October 15, 1915. Serial No. 56,080.

*To all whom it may concern:*

Be it known that I, WILLIAM F. HALL, a citizen of the United States, residing at Newton, county of Middlesex, State of Massachusetts, have invented a certain new and useful Improvement in Trolley-Ears, of which the following is a specification, reference being had therein to the accompanying drawings.

My invention relates to trolley ears which are adapted to secure a trolley wire to a hanger or other equivalent suspending means and has for its object the production of a new and improved form of ear adapted to be readily and quickly applied to the trolley wire which is so arranged and constructed that a trolley wheel may freely pass over it without arcing. Heretofore so far as known to me it has been customary in practice to employ a trolley ear having a groove along the lower side which is made fast to the wire by bending the lips of the groove around it and by soldering the ear to the wire. Ears of this type are difficult to make fast to the wire owing to the soldering operation necessary and it therefore takes some time to apply them which adds to the labor and expense and in many cases delays the traffic very considerably. Ears of this type also cause the trolley wheel to arc owing to the fact that the lips and other parts of the ear come into contact with the trolley wheel as it passes along the wire and cause it to jump. I am aware of the fact that so called mechanical trolley ears have been produced which are intended to eliminate the soldering operation required in the case of the ears just above referred to but so far as known to me such ears have been so constructed that they cause the trolley wheel to arc thereby greatly injuring the wheel and the ear itself.

The object of my invention is to produce a trolley ear which may be more readily attached to the wire than any heretofore constructed and which is so arranged that the trolley wheel may freely and smoothly pass over the ear without producing arcing. The ear embodying my invention is simple and inexpensive to produce and is adapted to securely hold the wire in position so that all creeping of the wire is eliminated. Furthermore, if it is desired to replace the wire, the ear may be readily detached from it and be used again which does not make it necessary to throw away the ear with the wire as is the case where the ears are soldered to it or are otherwise not readily detachable from it.

The invention will be fully understood from the following description when taken in connection with the accompanying drawings and the novel features thereof will be pointed out and clearly defined in the claims at the close of this specification.

In the drawings, Figure 1 is a vertical section showing a device embodying my invention secured to a trolley wire.

Figure 1:
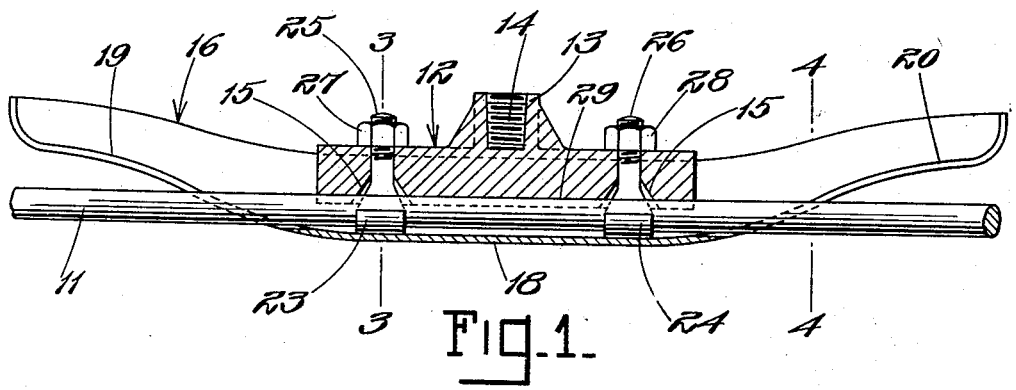
Figure 2:
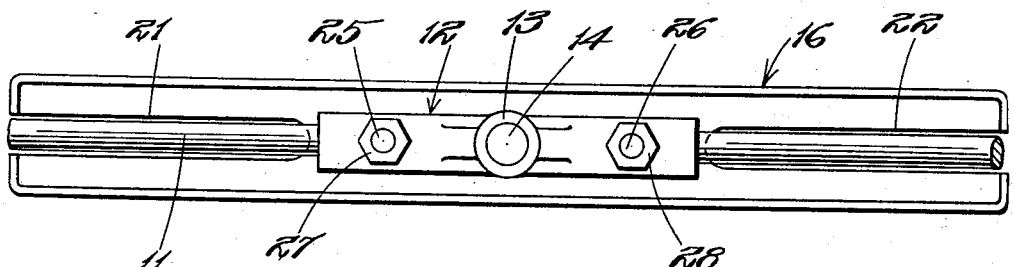
Fig. 2 is a plan view of the device shown in Fig. 1 showing it connected with a trolley wire.

Having reference to the drawings there is shown a trolley ear embodying my invention which is secured to a trolley wire 11. The trolley ear consists of a body member 12 provided with a hub or boss 13 having a threaded opening 14 to receive a correspondingly threaded connecting member of a suitable insulating hanger of common form not shown. The body member 12 is preferably rectangular in shape and at each side of the hub 13 is provided with holes which extend through the body and are enlarged at their lower ends as shown at 15 for reasons hereinafter to be described. The trolley ear consists also of a shield 16 preferably of thin metal which may be given the shape shown by casting or the like. The shield 16 is substantially trough shaped and is adapted to fit a trolley wheel 17 in a manner to be described. The central portion 18 of the bottom of the shield 16 is substantially flat and the ends 19 and 20 flare upwardly as shown. Slots 21 and 22 the width of which are slightly greater than the diameter of the wire 11 are provided in the ends 19 and 20 so that the shield may be placed in position about the wire from beneath.

Means for clamping the trolley ear to the wire are provided. A pair of hooked members 23, 24 having shanks 25, 26 are secured to the bottom of the shield 16 by welding or in other suitable manner. The hooks 23, 24 are flattened out as shown and are so located on the shield 16 that the shanks 25, 26 are adapted to be received within the holes in the body member 12 and to project above them. The upper ends of the shanks 25, 26 are threaded to receive suitable nuts 27, 28 by which the parts may be clamped securely together. The lower portion of the body 12 is provided with a shallow groove 29 longitudinally of its lower surface and centrally of the width thereof. The hook portions of the hooks 23, 24 are preferably flattened as described above in order to grip the wire 11 firmly, sufficient space between the end of the hook portion and the shank being left so that the hooks may be readily placed about the wire from beneath. The enlarged portions 15 of the holes referred to above are provided in order to enable the enlarged hooks 23, 24 to be drawn partially within the body member 12. The enlarged portions 15 are slightly larger than the enlarged hooks near the shank as shown which enables the wire 11 to spring upwardly slightly under the pressure exerted by the nuts 27, 28 which materially aids in clamping the trolley ear to the wire so that the wire is prevented from creeping longitudinally of the ear.

Figure 3:
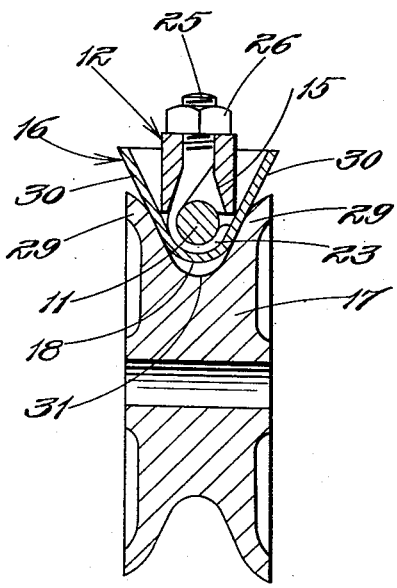
Fig. 3 is a sectional view of my device taken on line 3—3 of Fig. 1 and also a sectional view of a trolley wheel in connection therewith.
Figure 4:
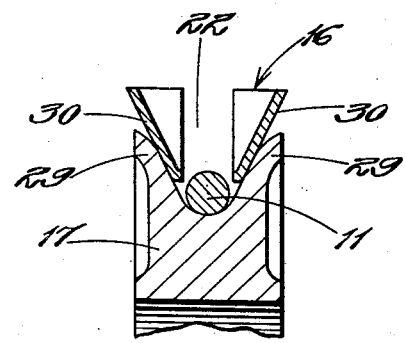
Fig. 4 is a sectional view of my device taken on line 4—4 of Fig. 1 and also a sectional view of a portion of a trolley wheel in connection therewith.

The shield 16 is so arranged that the inside of the flanges 29 of the trolley wheel 17 will contact with and run along on the sides 30 of the shield, the bottom 18 of the shield being out of contact with the central portion 31 of the trolley wheel groove as shown in Fig. 3. The upwardly flaring ends 19 and 20 of the shield are of the same shape as the central portion of the shield with the exception of the slot which is provided in order to permit the shield to be placed about the wire. The sides 30 at each end of the shield are arranged similarly to the sides 30 in the center of the shield so that a trolley wheel will contact at the same point on the sides as when in the center of the shield. As the trolley wheel runs along the wire 11 it contacts with the sides 30 of the shield as shown in Fig. 4 and thereafter is forced down a little away from the wire and runs upon the shield and thence to the wire at the other end.

I regard this as a very important feature of my invention for it often happens that the trolley wheel becomes worn by use so that the bottom of the groove which runs on the wire is worn inwardly as much as one-quarter of an inch. This materially changes the shape of the groove of the wheel at the bottom but not at the sides where the wear does not take place. The wheel, therefore, although worn at the bottom is adapted to fit over the shield as well as a new wheel so that arcing is entirely prevented. So far as known to me all mechanical ears which necessarily completely surround the wire in order to hold it up are adapted to contact with the central portion of the groove of the trolley wheel. When a worn wheel runs over the ear it does not fit the portion of the ear which it is adapted to run upon so that the tendency to jump about on the ear is greatly increased. In the device embodying my invention the width and angle of the sides 30 of the shield is the same throughout its length and the sides are carried upwardly at the ends of the shield a sufficient height so that a wheel which is extremely worn will pass beneath the ends of the shield and come in contact with it at the sides as shown in Fig. 4. In this way the device is particularly adapted to any type of trolley wheel even when it is old and badly worn.

In practice the device may be readily applied to the wire. The shield 16 may be pushed upwardly about the wire and the hooks 23, 24 which are secured to it may be placed about the wire as shown. At the same time the shanks 25, 26 of the hooks are inserted through the holes in the hanger body 12 and the nuts 27 and 28 are placed on them and turned down tightly.

The wire is passed through the slotted ends 19 and 20 of the shield and the hooks 23, 24 with which the shield is provided are placed about the wire. The shanks 25 and 26 of the hooks are passed through the holes in the body member 12 which is fast on the hanger not shown and the nuts 27 and 28 are turned down on the shanks of the hooks until the wire is firmly clamped between the hooks and the body member 12.

What I claim is:

1. The improved straight line trolley ear comprising a shield having a bottom and upwardly inclined ends with slots therein, a hook secured to said shield adjacent said bottom which is adapted to engage a trolley wire passing through said slots, a body member adapted to be received within said shield to engage said wire, and means for drawing said hook and body member together to clamp a trolley wire between them.

2. The improved straight line trolley ear comprising a shield having a bottom and upwardly inclined ends with slots therein to permit a trolley wire to rest adjacent the upper surface of said bottom, a hook secured to said shield adjacent said bottom which is adapted to engage a trolley wire passing through said slots, an upwardly projecting shank secured to said hook, a body member for engaging the opposite side of said wire from said hook, and means engaging said shank to draw said hook and body member together to clamp a trolley wire between them.

3. The improved straight line trolley ear comprising a shield having a bottom portion and upwardly inclined ends with slots therein to receive a trolley wire and permit it to lie adjacent the upper surface of said bottom, a hook having its outer curved end secured to the bottom of said shield substantially in line with said slots which is adapted to engage a trolley wire passing between them, a body member adapted to be received within said shield to engage the upper surface of said trolley wire, and means for drawing the hook and body member together to clamp a trolley wire between them.

4. The improved straight line trolley ear comprising a shield for guiding a trolley wheel having a bottom portion and upwardly inclined ends with slots therein, a hook secured adjacent the bottom of said shield and adapted to engage a straight line trolley wire passing through said slots, a shank on said hook, a body member adapted to be received within said shield to engage the upper surface of said trolley wire which has a hole therein through which the shank of said hook projects, and a nut threaded to said shank for drawing said hook and body member together to clamp a trolley wire between them.

5. The improved straight line trolley ear comprising a shield for guiding a trolley wheel having sides adapted to contact with the sides of the groove of a trolley wheel to guide the same and to hold the bottom of the groove of said trolley wheel away from the shield, a hook secured to said shield and adapted to engage a trolley wire, a body member adapted to engage the opposite side of said trolley wire from that engaged by said hook, and means for drawing said hook and body member together to clamp a trolley wire between them.

In testimony whereof I affix my signature, in presence of two witnesses.

WILLIAM F. HALL.

Witnesses:
GEORGE P. DIKE,
ALICE H. MORRISON.

Copies of this patent may be obtained for five cents each, by addressing the "Commissioner of Patents, Washington, D. C."